(12) United States Patent
Lundquist

(10) Patent No.: US 9,061,234 B2
(45) Date of Patent: Jun. 23, 2015

(54) GAS FILTER ASSEMBLIES AND METHODS FOR FILTERING GASES

(75) Inventor: Joseph E. Lundquist, Oldsmar, FL (US)

(73) Assignee: Pall Corporation, Port Washington, NY (US)

( * ) Notice: Subject to any disclaimer, the term of this patent is extended or adjusted under 35 U.S.C. 154(b) by 677 days.

(21) Appl. No.: 13/006,809

(22) Filed: Jan. 14, 2011

(65) Prior Publication Data

US 2012/0180664 A1    Jul. 19, 2012

(51) Int. Cl.
*B01D 39/00* (2006.01)
*B01D 46/52* (2006.01)

(52) U.S. Cl.
CPC .......... *B01D 46/523* (2013.01); *B01D 2265/06* (2013.01); *B01D 2275/50* (2013.01)

(58) Field of Classification Search
CPC .......................... B01D 46/523; B01D 2275/50
USPC ......... 95/273; 55/499, 521, DIG. 5, 524, 381; 96/67, 69
See application file for complete search history.

(56) References Cited

U.S. PATENT DOCUMENTS

| | | | |
|---|---|---|---|
| 3,807,150 A | 4/1974 | Maracle | |
| 3,914,116 A | 10/1975 | Westlin | |
| 5,084,178 A | 1/1992 | Miller et al. | |
| 5,098,767 A | 3/1992 | Linnersten | |
| 5,252,207 A | 10/1993 | Miller et al. | |
| 5,302,354 A | 4/1994 | Watvedt et al. | |
| 5,468,397 A * | 11/1995 | Barboza et al. | 210/798 |
| 5,840,094 A | 11/1998 | Osendorf et al. | |
| 5,993,501 A | 11/1999 | Cusick et al. | |
| 6,045,597 A | 4/2000 | Choi | |
| 6,402,613 B1 * | 6/2002 | Teagle | 454/195 |
| 6,932,850 B1 * | 8/2005 | Welch et al. | 55/521 |
| 7,217,333 B2 | 5/2007 | Sundet et al. | |
| 7,235,115 B2 * | 6/2007 | Duffy et al. | 55/497 |
| 2006/0123754 A1 | 6/2006 | Oelpke et al. | |
| 2009/0217820 A1 * | 9/2009 | Neudeck | 96/100 |

FOREIGN PATENT DOCUMENTS

| | | |
|---|---|---|
| CN | 201233084 Y | 5/2009 |
| EP | 0 082 106 A2 | 6/1983 |
| GB | 2 077 312 A | 12/1981 |
| JP | 59-7022 U | 1/1984 |
| JP | 2002-233725 A | 8/2002 |

OTHER PUBLICATIONS

Japanese-to-English machine conversion JP 2002-233725.

* cited by examiner

*Primary Examiner* — Robert Clemente
*Assistant Examiner* — Karla Hawkins
(74) *Attorney, Agent, or Firm* — Leydig, Voit & Mayer

(57) ABSTRACT

A gas filter assembly includes a housing and a gas filter positioned in the housing. The gas filter includes a pleated filter pack, a spacer arrangement which includes solidified bonding material between adjacent pleat legs on the upstream surface of the filter pack, and insert spacers between adjacent pleat legs on the downstream surface of the filter pack.

22 Claims, 2 Drawing Sheets

GAS FILTER ASSEMBLIES AND METHODS FOR FILTERING GASES

OVERVIEW OF THE INVENTION

The present invention relates to gas filter assemblies and methods for filtering gases which may be used to remove particulate material and other contaminants from a wide variety of gases in any of numerous environments. The particulate material may include small solid particles of various types, including dust, dirt, soot, and smoke particles and fibrous lint particles. The particulate material may also include liquid aerosol particles of various types, including water or oil mists.

Many different gases, including industrial gases and combustion gases, may contain particulate contaminants, and gas filter assemblies and methods for filtering gases which embody the invention are highly effective for removing particulate material from any of these gases. However, embodiments of the invention are particularly effective for removing particulate materials from breathable gases, such as air. For example, breathable gas circulating in a home, an office, a hospital, a clean room, or the cabin of a vehicle, train, boat, aircraft, or spacecraft may be directed through gas filter assemblies embodying the invention to remove particulate material and provide a clean, healthy breathing experience. In particular, the air in an aircraft cabin may be directed through a gas filter assembly embodying the invention and returned to the aircraft cabin to provide clean, healthful air to the aircraft passengers.

SUMMARY OF THE INVENTION

In accordance with one aspect of the invention, gas filter assemblies may comprise a housing and a gas filter. The housing may have a gas inlet and a gas outlet and may define a gas flow path between the gas inlet and the gas outlet. The gas filter, which may be positioned in the housing across the gas flow path, may comprise a pleated filter pack. The pleated filter pack may include a plurality of pleats which have longitudinally extending crests and roots and a pair of pleat legs that may extend from each crest to adjacent roots. The pleated filter pack may further include an upstream surface, a downstream surface, and a pleated fibrous filter medium arranged to remove particulates from gas flowing from the upstream surface to the downstream surface of the filter pack. The gas filter may also include a spacer arrangement positioned between adjacent pleat legs along the upstream surface of the filter pack and insert spacers positioned between adjacent pleat legs along the downstream surface of the filter pack. The spacer arrangement may include a solidified bonding material bonded to the upstream surface of the filter pack.

In accordance with another aspect of the invention, gas filter assemblies may comprise a housing and a pleated fibrous filter medium. The housing may have a gas inlet and a gas outlet and may define a gas flow path between the gas inlet and the gas outlet. The pleated fibrous filter medium, which may be positioned in the housing across the gas flow path, may include an upstream surface, a downstream surface, and a plurality of pleats. The pleats may include longitudinally extending crests and roots and pairs of pleat legs that extend from each crest to adjacent roots. The pleated fibrous filter medium is arranged to remove particulates from gas flowing from the upstream surface to the downstream surface of the filter medium. The gas filter assemblies may further include a plurality of hot-melt spacer beads positioned between adjacent pleat legs and bonded to the upstream surface of the filter medium and corrugated insert spacers positioned between adjacent pleat legs along the downstream surface of the filter medium. The plurality of hot-melt spacer beads are spaced from one another to define gas flow channels extending between adjacent pleat legs along the upstream surface of the filter medium.

Gas filter assemblies embodying the invention have many advantages. For example, embodiments of the invention not only effectively remove particulate material from a gas but are also capable of capturing and holding large quantities of particulate material before being replaced. Consequently, gas filter assemblies embodying the invention may effectively remove particulate material over a longer service life, which enhances reliability, reduces downtime, and generates less waste because the gas filter assemblies may be replaced less often.

DESCRIPTION OF EMBODIMENTS

Figure 1:
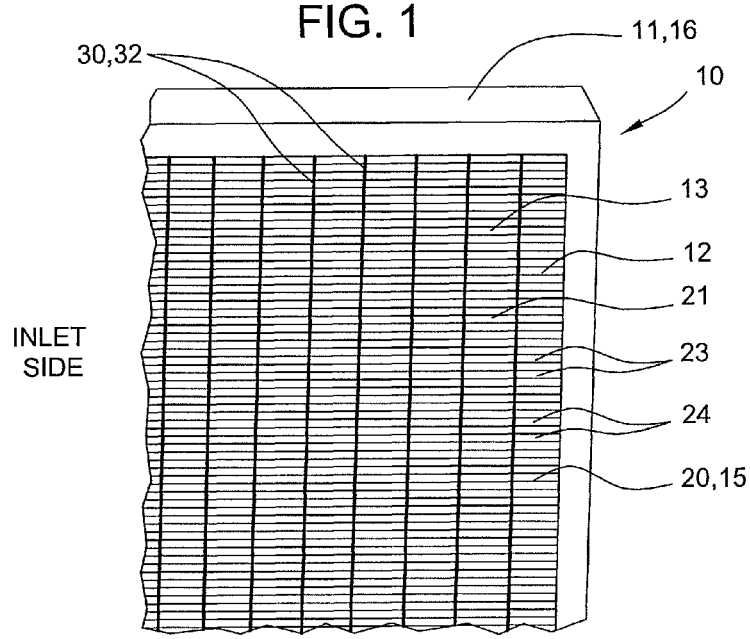
FIG. 1 is an isometric view of a portion of the upstream side of a gas filter assembly.
Figure 2:
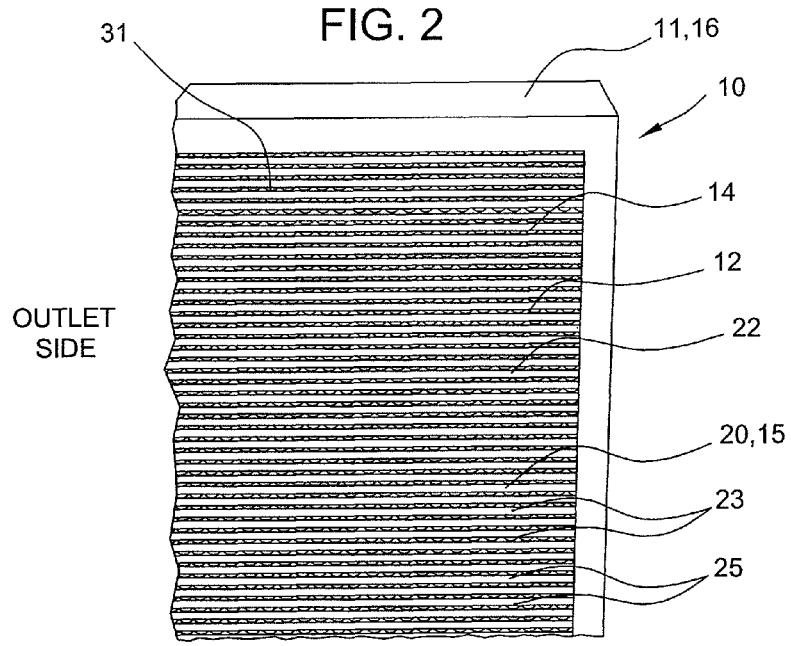
FIG. 2 is an isometric view of a portion of the downstream side of the gas filter assembly of FIG. 1.
Figure 3:
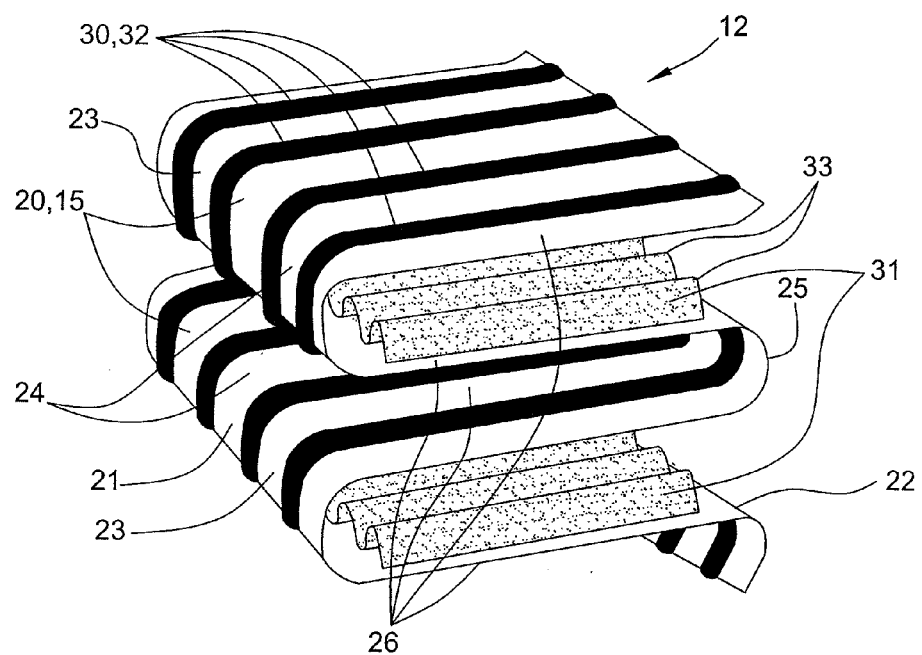
FIG. 3 is an expanded isometric view of the pleated gas filter of FIGS. 1 and 2.

Gas filter assemblies embodying the invention may be configured in a wide variety of ways. One of many different examples of a gas filter assembly is shown in FIGS. 1-3. Generally, the gas filter assembly 10 may include a housing 11 and a gas filter 12. The housing 11 may have a gas inlet 13 and a gas outlet 14 and may define a gas flow path in the interior of the housing 11 between the gas inlet 13 and the gas outlet 14. The gas filter 12 may have a porous, pleated filter medium 15 for removing particulate material and may be positioned in the housing 11 across the gas flow path. A gas containing particulate material may be passed into the housing 11 through the gas inlet 13 and along the gas flow path through the pleated filter medium 15 of the gas filter 12. Particulate material may be captured and held by the filter medium 15, while the filtrate gas exits the housing 11 via the gas outlet 14.

The housing may be formed from a variety of materials, including a metal, and may be configured in any of numerous ways. For example, the housing may be a container, e.g., a vessel or a plenum, having at least two openings fluidly communicating with the interior of the container and serving as the gas inlet and the gas outlet. Further, the housing may have any of a variety of regular or irregular shapes and sizes, and the gas inlet and the gas outlet may be on the same side or on different sides of the housing. For example, the housing may have a generally cylindrical shape or a boxlike shape. In the illustrated embodiment, the housing 11 may comprise a frame 16 having U-channel frame members, may be configured, for example, as a rectangular parallelepiped, and may have open faces on opposite sides serving as the gas inlet 13 and the gas outlet 14. The gas filter may be positioned in the interior of the housing in a variety of ways. For example, the gas filter may be sealed to the housing by means of a potting resin.

The gas filter may include a pleated filter pack which may have any of numerous configurations. For example, the pleated filter pack may have a hollow, generally cylindrical configuration. In the illustrated embodiment, the pleated filter pack 20 has a boxlike or panel configuration. The pleated filter pack 20, including the pleated filter medium 15, has an upstream surface 21 and a downstream surface 22 and includes a plurality of longitudinally-extending pleats 23. The pleats 23 may have crests 24 and roots 25 and a pair of pleat legs 26 that extend from each crest 24 to adjacent roots 25. The pleats may have any desired height. For many embodiments, the pleat heights may be in the range from about one inch or less to about six inches or more. Some embodiments may have a pleat height in the range from about four to about five inches. The pleated filter pack 20 may be configured in a wide variety of ways. For example, the pleated filter pack 20 may have a pleated multilayer structure, including one or more layers of a filter medium 15 and at least one additional porous layer. The additional porous layer(s) may serve any of numerous functions. For example, the additional porous layer(s) may include a support layer; a cushioning layer, such as the cushioning layer described in U.S. Pat. No. 5,252,207; and/or a purification layer, such as a sorbent-containing layer for removing chemical contaminants as described in U.S. Pat. No. 5,302,354. The additional porous layer(s) may be pleated along with the filter medium 15 upstream and/or downstream of the filter medium 15 to form a pleated multilayer composite. However, for many embodiments, the pleated filter pack 20 may be a pleated single layer structure, the single layer comprising the filter medium 15. The upstream surface 21 and downstream surface 22 of the filter pack 20 may then be the upstream surface 21 and downstream surface 22 of the filter medium 15. The single layer structure, which may be lighter than a multilayer structure, is particularly advantageous for cabin air filtration, e.g., in an aircraft, where lighter weight is an advantage.

The filter medium may comprise a porous, fibrous woven or nonwoven medium formed from fibers, including filaments, of a natural polymer, a synthetic polymer, and/or glass, for example. The fibers may have any desired nominal diameter and length. The filter medium may comprise one or more additional components, including, for example, a binder resin, a biocide, and/or a flame retardant. The fibrous filter medium may have any desired removal rating. For example, many embodiments include a fibrous filter medium having a HEPA rating or finer, while other embodiments may include a fibrous filter medium having a removal rating coarser than a HEPA rating. For some fibrous filter media, one side of the filter medium, i.e., the loft side, may provide more open spaces to capture particulate material than the opposite side of the filter media. For many embodiments, the loft side of the fibrous filter medium may be arranged in the filter pack as the upstream surface of the fibrous filter medium.

In addition to the filter medium 15, the gas filter 12 may comprise a spacer arrangement 21 between one or more, e.g., all, pairs of adjacent pleat legs 26 along the upstream surface 21 of the filter pack 20 and insert spacers 31 between one or more, e.g., all, pairs of adjacent pleat legs 26 along the downstream surface 22 of the filter pack 20. The spacer arrangement 21 may comprise a solidified bonding material that is bonded to the upstream surface 21 of the filter pack 20. Where the filter medium 15 is the sole layer or the most upstream layer of the filter pack 20, the solidified bonding material may be bonded to the upstream surface 21 of the filter medium 15. For many embodiments, the solidified bonding material may comprise a hot-melt material that may be applied to the upstream surface 21 as a viscous liquid, where it bonds to the upstream surface 21 and solidifies to form a bead 32 that spaces adjacent pleat legs 26 from one another. The thickness of the bead 32 may be from about 0.025 inch or less to about 0.200 inch or more. For many embodiments, the bead thickness may be about 0.050 inch. The hot-melt material may comprise thermoplastic and/or thermosetting materials. For example, the hot-melt material may comprise an EVA (ethylene vinyl acetate) resin, polyolefins, amorphous polyolefin, polyamides, polyesters, thermoplastic polyurethanes, reactive polyurethane hot-melts (PUR's), styrene block copolymers (e.g., rubber based), polycaprolactones, polycarbonates, silicone rubbers, and thermoplastic elastomers. Some examples of hot-melt bead spacers are disclosed in U.S. Pat. Nos. 5,084,178 and 5,252,207.

Alternatively, the solidified bonding material may comprise a solid thermoplastic material that, for example, may have a lower softening point than the fibers of the filter medium. For some embodiments, a rod of the solid thermoplastic material may be applied to the upstream surface of the filter pack between adjacent pleat legs, heated to its softening point, and allowed to cool. As the softened thermoplastic material cools, it bonds to the upstream surface and resolidifies to form a bead that spaces adjacent pleat legs from one another.

The solidified bonding material of the spacer arrangement 30 may be applied to the upstream surface 21 in any regular or irregular configuration. For example, the solidified bonding material may be applied to the upstream surface as an array of generally parallel elongated continuous or discontinuous beads 32. The parallel beads 32 may define gas flow channels extending from the crests 24 toward the roots 25 between adjacent pleat legs 26 along the upstream surface 21. For many embodiments, the parallel beads 32 may be evenly spaced from one another, wherein the distance between adjacent beads 32 is generally constant. The distance may be in the range from about 0.125 inch or less to about 1.25 inch or more. For many embodiments, the distance may be in the range from about 0.75 inch to about 1.20 inch. Alternatively, the parallel beads may be spaced unevenly. For many embodiments, the parallel beads 32 may extend along the upstream surface 21 at an angle generally perpendicular to the longitudinally extending crests 24 and roots 25. The portions of each bead 32 of solidified bonding material that are bonded to a pleat leg 26 may then be aligned and stacked from pleat 23 to pleat 23 along the pleated filter pack 20, as shown in FIG. 1. Alternatively, the parallel beads may extend along the upstream surface 21 at an angle somewhat more or less than 90°, e.g., ±30°, to the longitudinally extending crests 24 and roots 25. For some embodiments, one or more, e.g., all, of the parallel beads 32 may extend continuously along the upstream surface 21 from pleat 23 to pleat 23 of the pleated filter pack 20. The portions of the continuous beads 32 that extend along adjacent pleat legs 26 may contact and be bonded to one another as well as the upstream surface 21 of the adjacent pleat legs 26, providing added bond strength to prevent pleat separation. The spacing between adjacent pleat legs 26 along the upstream surface 21 may then correspond to twice the bead thickness. For other embodiments, one or more, e.g., all, of the parallel beads may extend discontinuously along the upstream surface 21 from pleat 23 to pleat 23 of the pleated filter pack 20. Gaps or breaks in the discontinuous beads may be provided at the fold lines of the filter pack 20 at the crests 24 and/or roots 25. Further, to more closely space adjacent pleat legs 26 along the upstream surface 21, only a single portion of a discontinuous bead may extend between adjacent pleat legs 26, beginning near a crest 24 and terminating near a root 25. The single bead portion may be bonded to the upstream surface 21 of both adjacent pleat legs 26. The spacing between adjacent pleat legs 26 along the upstream surface 21 may then correspond to a single bead thickness. Generally, the spacing between adjacent pleats 23 on the upstream surface 21 may be in the range from about 0.030 inch or less to about 0.375 inch or more. For many embodiments, the spacing may be in the range from about 0.080 inch to about 0.100 inch.

The insert spacers 31 on the downstream surface 22 of the filter pack 20 may be configured in a wide variety of ways to maintain spacing between adjacent pleat legs 26 without unduly restricting the flow of gas between adjacent pleat legs 26. For example, the insert spacers may comprise a metal or polymeric mesh sheet or a thin metal or polymeric plate having gas flow channels, the mesh sheet or channeled plate being positioned between the adjacent pleat legs on the downstream surface. The insert spacers 31, which are not pleated with the filter pack 20, may contact and may or may not be bonded to the downstream surface 22 of the filter pack 20 to direct gas from between the adjacent pleat legs 26 out of the filter pack 20. Each insert spacer 31 may extend from a crest 24 to or even past the corresponding roots 25. Generally, the spacing provided by the insert spacers 31 between adjacent pleats 23 on the downstream surface 22 may be in the range from about 0.030 inch or less to about 0.375 inch or more. For many embodiments, the spacing may be in the range from about 0.060 inch to about 0.100 inch. In addition, the spacing between adjacent pleats 23 on the downstream surface 22 may be less than the spacing between adjacent pleats 23 on the upstream surface.

For many embodiments, the insert spacers 31 may comprise a thin corrugated metal or polymeric sheet, for example, a corrugated metal foil sheet, e.g., a corrugated aluminum foil sheet. Some examples of corrugated insert spacers are disclosed in U.S. Pat. No. 3,914,116. The corrugated insert spacer may be configured in any of numerous ways. For example, the corrugated spacer may or may not be perforated. The corrugations 33 may have various shapes, including a wave shape, e.g., a sinusoidal wave or a square wave shape. For many embodiments, the corrugations may have a generally sawtooth or triangular wave shape. The corrugations of the insert spacer 31 may extend generally perpendicular to the longitudinally extending crests 24 and roots 25 and/or generally parallel to any parallel beads 32 of the upstream spacer arrangement 30. The peak-to-peak height of the corrugations may have any desired value. For many embodiments, the peak-to-peak height of the corrugations may be in the range from about 0.05 inch or less to about 0.50 inch or more. Smaller peak-to-peak pleat heights allow for smaller spacing between adjacent pleat legs 26 on the downstream side 22, increasing the number of pleats 23 and the surface area of the filter medium 15. Consequently, many embodiments may have a peak-to-peak pleat height in the range from 0.07 inch to 0.12 inch. The distance between adjacent corrugations may also have any desired value. For many embodiments, the distance between adjacent corrugations may be in the range from about 0.06 inch or less to about 0.25 inch or more, for example, about 0.125 inch. To better support the pleat legs 26 against the forces associated with the differential pressure across the filter pack 20, the distance between adjacent corrugations of the corrugated spacer 31 on the downstream side 22 may be less than the distance between adjacent beads 32 of the spacer arrangement 30 on the upstream side 21. For example, the distance between adjacent corrugations may be less than or equal to about one-half or about one-fifth or about one-tenth of the distance between adjacent beads 32.

Gas filter assemblies embodying the invention provide many advantages. For example, the spacer arrangement including the solidified bonding material on the upstream surface of the filter pack may define larger gas flow channels deep into the pleats on the upstream surface of the filter pack. These larger gas flow channels permit a broad range of particulate contaminants, from submicron dust particles to long textile fibers, to contact and more evenly load the entire upstream surface of the filter pack from the crests to the roots of the pleats. This even loading of the filter pack increases the dirt holding capacity of the filter pack and slows the increase in differential pressure across the filter pack. Consequently, the interval between change-outs can be greatly extended. Further, the insert spacers on the downstream surface of the filter pack provide enhanced stiffness to the filter pack. The larger gas flow channels provided by the solidified bonding material of the spacer arrangement on the upstream surface may be firmly supported on the downstream side by the insert spacers, which prevent distortion and/or rupture of the filter pack from forces associated with the increasing differential pressure across the filter pack. Consequently, gas filter assemblies embodying the invention enhance reliability by enhancing the structural integrity of the filter pack and reduce downtime and waste by extending the service life of the filter pack.

EXAMPLE

This example demonstrates the superiority of gas filter assemblies embodying the invention.

Three gas filter assemblies (GFA I-III) are made, each having the same fibrous filter medium with about the same upstream surface area (110 sq. ft.). GFA I has a housing containing a gas filter including a pleated filter pack with the fibrous filter medium, a spacer arrangement including a solidified bonding material between adjacent pleat legs on the upstream surface of the filter pack, and insert spacers between adjacent pleat legs on the downstream surface of the filter pack. GFA II has a housing containing a gas filter including a pleated filter pack with the fibrous filter medium, a spacer arrangement including a solidified bonding material between adjacent pleat legs on the upstream surface of the filter pack, and a spacer arrangement including a solidified bonding material between adjacent pleat legs on the downstream surface of the filter pack. GFA III has a housing containing a gas filter including a pleated filter pack with the fibrous filter medium, insert spacers between adjacent pleat legs on the upstream surface of the filter pack, and insert spacers between adjacent pleat legs on the downstream surface of the filter pack. The housings and the pleats of the filter packs of GFA I-III are similarly configured. The spacer arrangements of GFA I and II are similarly configured and include parallel beads of the solidified bonding material. The insert spacers of GFA I and III are similarly configured and include corrugated insert spacers.

Each gas filter assembly is tested in the same filter test fixture. The same gas containing the same concentration of ISO Fine Test Dust (ISO standard ISO1210-A3) is directed through each gas filter assembly at the same flow rate. Flow through each gas filter assembly is terminated at the same terminal differential pressure. The dirt holding capacity of each gas filter assembly is determined by comparing the weight of the clean gas filter assembly to the weight of the gas filter assembly removed from the filter test fixture upon reaching the terminal differential pressure.

GFA I, which embodies the invention, captures and holds 2413 grams of ISO test dust. GFA II captures and holds only 2000 grams of ISO test dust, while GFA III captures and holds only 1999 grams of ISO test dust. Consequently, GFA I has a dirt holding capacity which is 21% greater than GFA II or GFA III. The higher dirt holding capacity of GFA I correlates to a longer service life for GFA I than either GFA II or GFA III.

The invention claimed is:

1. A gas filter comprising a housing having a gas inlet and a gas outlet and defining a gas flow path between the gas inlet and the gas outlet and a gas filter positioned in the housing across the gas flow path, the gas filter including a pleated filter pack which includes a plurality of pleats having longitudinally extending crests and roots and a pair of pleat legs extending from each crest to adjacent roots, wherein the pleated filter pack has an upstream surface, a downstream surface, and a pleated fibrous filter medium arranged to remove particulates from gas flowing from the upstream surface to the downstream surface of the filter pack, a spacer arrangement positioned between adjacent pleat legs along the upstream surface of the filter pack, the spacer arrangement including spaced, parallel beads of a solidified bonding material bonded to and extending along the upstream surface of the pleated filter pack, and insert spacers positioned between adjacent pleat legs along the downstream surface of the filter pack, wherein the insert spacers comprise a corrugated material having a plurality of gas flow channels and corrugations that are spaced from one another a distance which is less than a distance between adjacent parallel beads of solidified bonding material.

2. The gas filter assembly of claim 1 wherein the pleated fitter pack is a single layer structure, the single layer comprising the pleated fibrous filter medium.

3. The gas filter assembly of claim 1 wherein adjacent pleat legs are spaced further apart along the upstream surface by the spacer arrangement than along the downstream surface by the insert spacers.

4. The gas filter assembly of claim 1 wherein the fibrous filter medium has a HEPA or finer removal rating.

5. The gas filter assembly of claim 1 wherein the fibrous filter medium has a removal rating coarser than a HEPA rating.

6. The gas filter assembly of claim 1 wherein the parallel beads defining gas flow channels between adjacent pleat legs.

7. The gas filter assembly of claim 6 wherein a bead of the solidified bonding material extends continuously from pleat to pleat along the upstream surface of the filter pack.

8. The gas filter assembly of claim 1 wherein the solidified bonding material comprises a hot-melt material.

9. The gas filter assembly of claim 1 wherein the corrugated material comprises at least one of a corrugated metal and a polymeric sheet.

10. The gas filter assembly of claim 9 wherein the corrugated material has corrugations which extend generally perpendicular to the crests and roots of the pleated filter pack.

11. A gas filter assembly comprising a housing having a gas inlet and a gas outlet and defining a gas flow path between the gas inlet and the gas outlet, a pleated fibrous filter medium positioned in the housing across the gas flow path, the pleated fibrous filter medium including an upstream surface, a downstream surface, and a plurality of pleats, wherein the plurality of pleats has longitudinally extending crests and roots and a pair of pleat legs extending from each crest to adjacent roots and wherein the pleated fibrous fitter medium is arranged to remove particulates from gas flowing from the upstream surface to the downstream surface of the filter medium, hot-melt spacer beads positioned between adjacent pleat legs and bonded to the upstream surface of the filter medium, wherein a plurality of the hot-melt spacer beads are spaced from one another to define gas flow channels extending between adjacent pleat legs along the upstream surface of the filter medium, and corrugated insert spacers positioned between adjacent pleat legs along the downstream surface of the filter medium, wherein the corrugated insert spacers include a plurality of gas flow channels and corrugations that are spaced from one another by a distance that is less than a distance between adjacent hot-melt spacer beads.

12. The gas filter assembly of claim 11 wherein adjacent pleat legs are spaced further apart along the upstream surface by the hot-melt spacer beads than along the downstream surface by the corrugated insert spacers.

13. The gas filter assembly of claim 11 wherein the fibrous filter medium has a HEPA or finer removal rating.

14. The gas filter assembly of claim 11 wherein the fibrous filter medium has a removal rating coarser than a HEPA rating.

15. The gas filter assembly of claim 11 wherein the hot-melt spacer beads extend perpendicular to the crests and roots of the pleated fibrous filter medium.

16. The gas filter assembly of claim 11 wherein a hot-melt spacer bead extends continuously from pleat to pleat along the upstream surface of the pleated fibrous filter medium.

17. The gas filter assembly of claim 11 wherein the corrugations of the corrugated insert spacers extend perpendicular to the crests and roots of the pleated fibrous filter medium.

18. The as filter assembly of claim 17 wherein the distance between adjacent hot-melt beads is at least twice as long as the distance between adjacent corrugations of the corrugated insert spacer.

19. The gas filter assembly of claim 1 wherein the housing generally has the form of a rectangular parallelepiped.

20. A method for removing particulates from the air of an aircraft cabin comprising directing the air from the cabin through a gas filter assembly of claim 1 and returning the filtered air to the aircraft cabin.

21. The gas filter assembly of claim 1 wherein the plurality of gas flow channels extend from each crest to at least the adjacent root.

22. The gas filter assembly of claim 1 wherein the corrugated material includes a plurality of perforations.

* * * * *